United States Patent [19]

Richardson

[11] Patent Number: 5,667,052
[45] Date of Patent: Sep. 16, 1997

[54] HYDRAULIC CONTROL SYSTEM FOR A SYNCHRONIZER

[75] Inventor: Michael Richardson, Hornchurch, Great Britain

[73] Assignee: New Holland North America, Inc., New Holland, Pa.

[21] Appl. No.: 588,188

[22] Filed: Jan. 18, 1996

[30] Foreign Application Priority Data

Jan. 21, 1995 [GB] United Kingdom ............... 95.01.194

[51] Int. Cl.⁶ ................................................ F16D 25/08
[52] U.S. Cl. ................... 192/85 R; 192/52.4; 192/109 F
[58] Field of Search ............................. 192/85 R, 109 F, 192/52.4, 52.5, 86

[56] References Cited

U.S. PATENT DOCUMENTS

| | | | |
|---|---|---|---|
| 4,884,667 | 12/1989 | Koga | 192/3.55 |
| 5,487,318 | 1/1996 | Schott | 74/606 R |

FOREIGN PATENT DOCUMENTS

| | | |
|---|---|---|
| 0088184 | 9/1983 | European Pat. Off. . |
| 0310387 | 4/1986 | European Pat. Off. . |
| 1458885 | 12/1965 | United Kingdom . |
| 1049924 | 11/1966 | United Kingdom . |
| 2119459 | 11/1983 | United Kingdom . |

*Primary Examiner*—Andrea L. Pitts
*Attorney, Agent, or Firm*—Larry W. Miller; John W. Stader; Frank A. Seemar

[57] ABSTRACT

A hydraulic control system for displacing a synchronizer into engagement with a rotating gear in a gearbox includes a hydraulic piston/cylinder unit mechanically coupled to the synchronizer, an electrically controllable pressure regulating valve for supplying hydraulic fluid to the piston/cylinder unit and an electrical control circuit acting on the pressure regulating valve to vary the pressure of the hydraulic fluid supplied to the piston/cylinder unit. In order to effect a rapid and smooth engagement of the synchronizer, the control circuit acts to increase the pressure of the hydraulic fluid supplied to the piston/cylinder unit progressively.

4 Claims, 2 Drawing Sheets

HYDRAULIC CONTROL SYSTEM FOR A SYNCHRONIZER

BACKGROUND OF THE INVENTION

The present invention relates to a hydraulic control system for displacing a synchronizer into engagement with a rotating gear in a gearbox.

It is known for an engine to drive two wet clutches that lie in parallel torque output paths. The output of the first clutch in the first torque transmission path directly drives the input shaft of a gearbox. A first gear that is fast in rotation with the gearbox input shaft directly meshes with a first gear that is rotatably supported on a lay shaft driven by the output of second clutch in the second torque transmission path. Similarly, a second gear on the shaft meshes by way of a reversing idler gear with a second gear that is rotatably supported on the lay shaft. A synchronizer movable by a selector over the lay shaft can couple the lay shaft selectively for rotation with the first and second gears.

When the tractor is being driven, one or other of the two clutches is engaged. The effect of switching between the two torque transmission paths, by disengaging one clutch at the same time as engaging the other, depends on the position of the synchronizer. If the synchronizer is engaged with the first gear, then the two torque transmission paths drive the gearbox in the same direction but with different transmission ratios, resulting in a change between a higher and a lower ratio. On the other hand, if the synchronizer is engaged with the second gear, then the torque is reversed when transmitted through the second path on account of the idler gear and switching between the two torque transmission paths causes a power shuttle to occur, that is to say the tractor changes between a low forward gear and reverse gear.

Movement of the synchronizer is carried out while the second clutch is disengaged to select the operating mode, that is to say to switch between High/Low Mode and Shuttle Mode. When the second clutch is disengaged, the lay shaft is simply floating and its speed and direction of rotation will be determined by the balance of the frictional forces acting on it. For this reason, the synchronizer will not normally be rotating at the same speed as the gear with which it is about to engage, be it the first or the second gear, and if it is simply forced into rapid engagement by suddenly applying a force to it using a hydraulic piston/cylinder unit, then wear will be caused to the synchronizer and the gears.

The present invention therefore seeks to provide a electro-hydraulic control system for displacing a synchronizer into engagement with a rotating gear in a gearbox, which reduces wear on the mechanical components and permits rapid and smooth engagement of the synchronizer with the gear.

SUMMARY OF THE INVENTION

According to the present invention, there is provided a hydraulic control system for displacing a synchronizer into engagement with a rotating gear in a gearbox, the control system comprising a hydraulic piston/cylinder unit mechanically coupled to the synchronizer, an electrically controllable pressure regulating valve for supplying hydraulic fluid to the piston/cylinder unit and an electrical control circuit for acting on the pressure regulating valve to vary the pressure of the hydraulic fluid supplied to the piston/cylinder unit, wherein during each engagement movement of the synchronizer, the control circuit is operative to increase the pressure of the hydraulic fluid supplied to the piston/cylinder unit progressively.

By progressively increasing the pressure in the piston/cylinder unit a small force is initially applied to the synchronizer to urge it into engagement with the rotating gear. The resulting small frictional forces between the two will match the speed of the lay shaft and the synchronizer to that of the rotating gear without causing excessive wear. When the force is subsequently increased, it will bring the synchronizer teeth and the gear into mesh with one another but at this time the gear and synchronizer will be rotating in unison and this will not result in wear of the teeth.

It would be possible to effect a smooth engagement of the synchronizer with the gear by applying a gradually ramped pressure to the piston/cylinder unit in an open loop control system. This however does not optimize operation, in that the engagement may take longer than necessary.

The operation of a synchronizer may be considered as comprising three distinct stages. In the first, the speed of the synchronizer is matched to the gear by friction. In the second, the phase of the rotation of the synchronizer is varied slightly to bring its teeth into mesh with the teeth on the gear. Finally, when the two sets of teeth are aligned and rotating at the same speed, then pressure can safely be applied to force them into mesh with one another.

Thus in a typical synchronizer, conical frictional surfaces on the synchronizer and the gear will produce the desired speed matching. Next, tapered axial ends on the meshing teeth will cause the desired axial alignment before the teeth are driven into meshing engagement with one another.

In the preferred embodiment of the invention, means are provided for sensing when axial engagement between the teeth of the synchronizer and the gear has been achieved and thereafter the hydraulic pressure is rapidly increased to its maximum value to effect rapid full engagement of the synchronizer.

The axial engagement of the teeth may be determined either by sensing the position of the synchronizer or by sensing the drop in pressure in the piston/cylinder unit resulting from the movement of the synchronizer.

It is not essential that the ramped pressure start from a value of zero. In practice, it is found that because of friction, also termed stiction, no movement of the piston in the piston/cylinder unit occurs until a minimum pressure value is reached. This minimum pressure can be determined by calibration and may vary with the position of the synchronizer at the commencement of the desired movement.

To avoid unnecessarily wasting time ramping up the pressure without causing movement of the piston, it is preferred to apply a pressure that commences with a calibrated value sufficient to overcome stiction and thereafter to increase the pressure as a function of time. This function need not be a linear function.

The control of the pressure regulating valve can be effected using analogue techniques but it is preferred to regulate the supplied pressure by applying pulse width modulated control signals to the valves.

Apart from enabling direct control of the valves by means of a digital control circuit, such an embodiment also allows a dithering to be applied to piston, to reduce any tendency of the piston to stick in any position.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
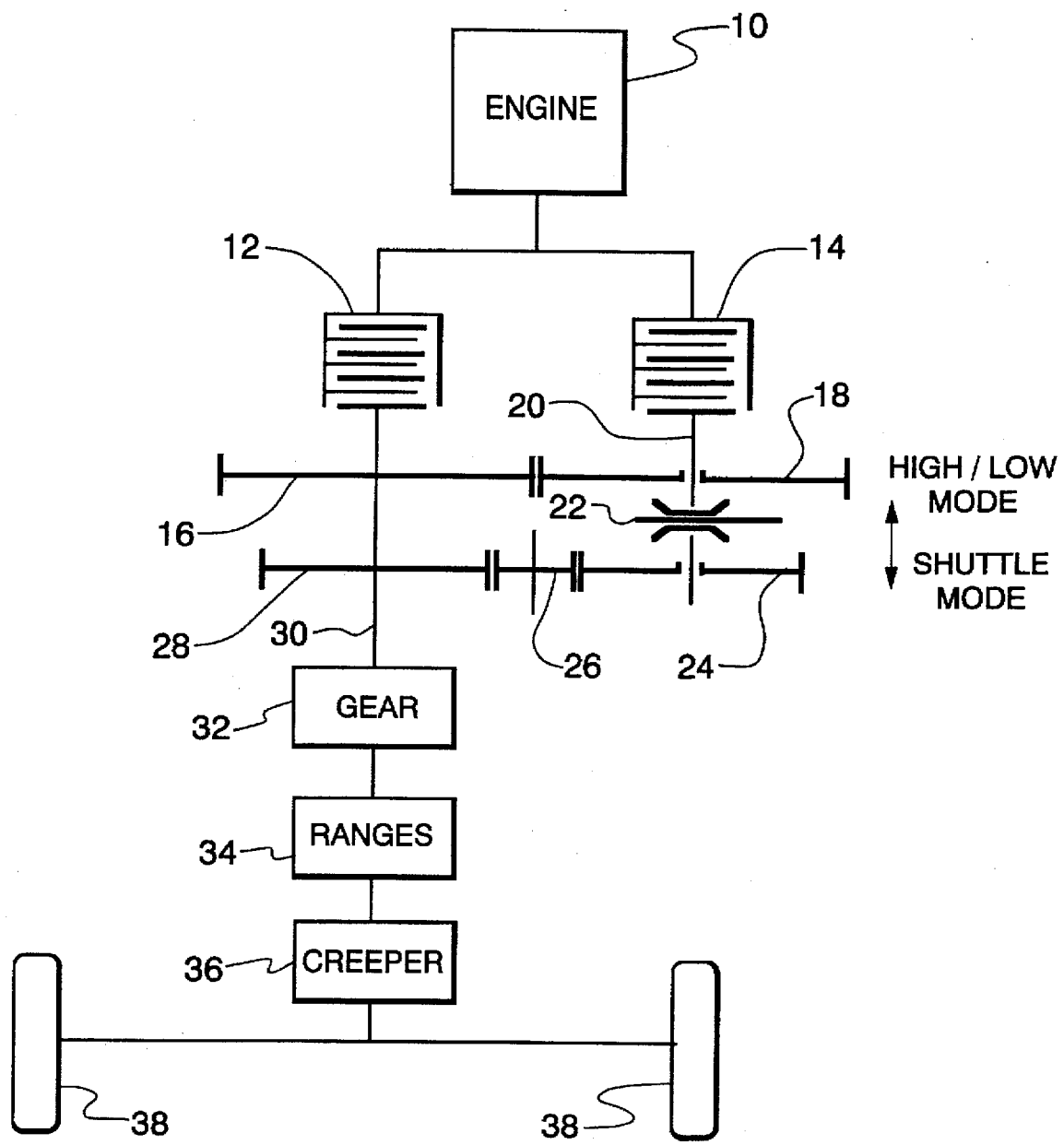
FIG. 1 is a schematic representation of a drive train of a tractor incorporating the principles of the instant invention.

Referring now to FIG. 1, an engine 10 drives two wet clutches 12 and 14 that lie in parallel torque output paths. The output of the first clutch 12 in the first torque transmission path directly drives the input shaft 30 of a gearbox 32. A first gear 16 that is fast in rotation with the gearbox input shaft 30 directly meshes with a first gear 18 that is rotatably supported on a lay shaft 20 connected to the output of the second clutch 14. Similarly, a second gear 28 on the gearbox input shaft 30 meshes by way of a reversing idler gear 26 with a second gear 24 that is rotatably supported on the lay shaft 20. A synchronizer 22, movable over the lay shaft 20 by a selector in the direction of the illustrated arrows, serves to couple the lay shaft selectively for rotation with one or the other of the gears 18 and 24.

To provide the multiple gears ratios that are required in a tractor, the gearbox 32 is connected to the drive wheels 38 through further reduction gearboxes 34 and 36 the first of which allows range selection and the second is a creeper control.

When the tractor is being driven, one or the other of the two clutches 12 and 14 is engaged. The effect of switching between the two torque transmission paths, by disengaging one clutch at the same time as engaging the other, depends on the position of the synchronizer 22. If the synchronizer 22 is engaged with the gear 18, then the two torque transmission paths drive the gearbox 32 in the same direction but with different transmission ratios, resulting in a change between a higher and a lower ratio. On the other hand, if the synchronizer is engaged with the gear 24, then the torque is reversed when transmitted through the path containing the clutch 14 on account of the idler gear 26 and switching between the two torque transmission paths causes a power shuttle to occur, with the tractor changing between a low forward gear and reverse gear.

Movement of the synchronizer 22 is carried out while the clutch 14 is disengaged to select the operating mode, that is to say to switch between High/Low Mode and Shuttle Mode. When the second clutch 14 is disengaged, the lay shaft 20 is simply floating and its speed and direction of rotation will be determined by the balance of the frictional forces acting on it. For this reason, the synchronizer 22 will not normally be rotating at the same speed as the gear with which it is about to engage, be it the gear 18 or the gear 24, and if it is simply forced into rapid engagement by suddenly applying a force to it using a hydraulic piston/cylinder unit, then wear will be caused to the synchronizer and the gears.

Figure 2:
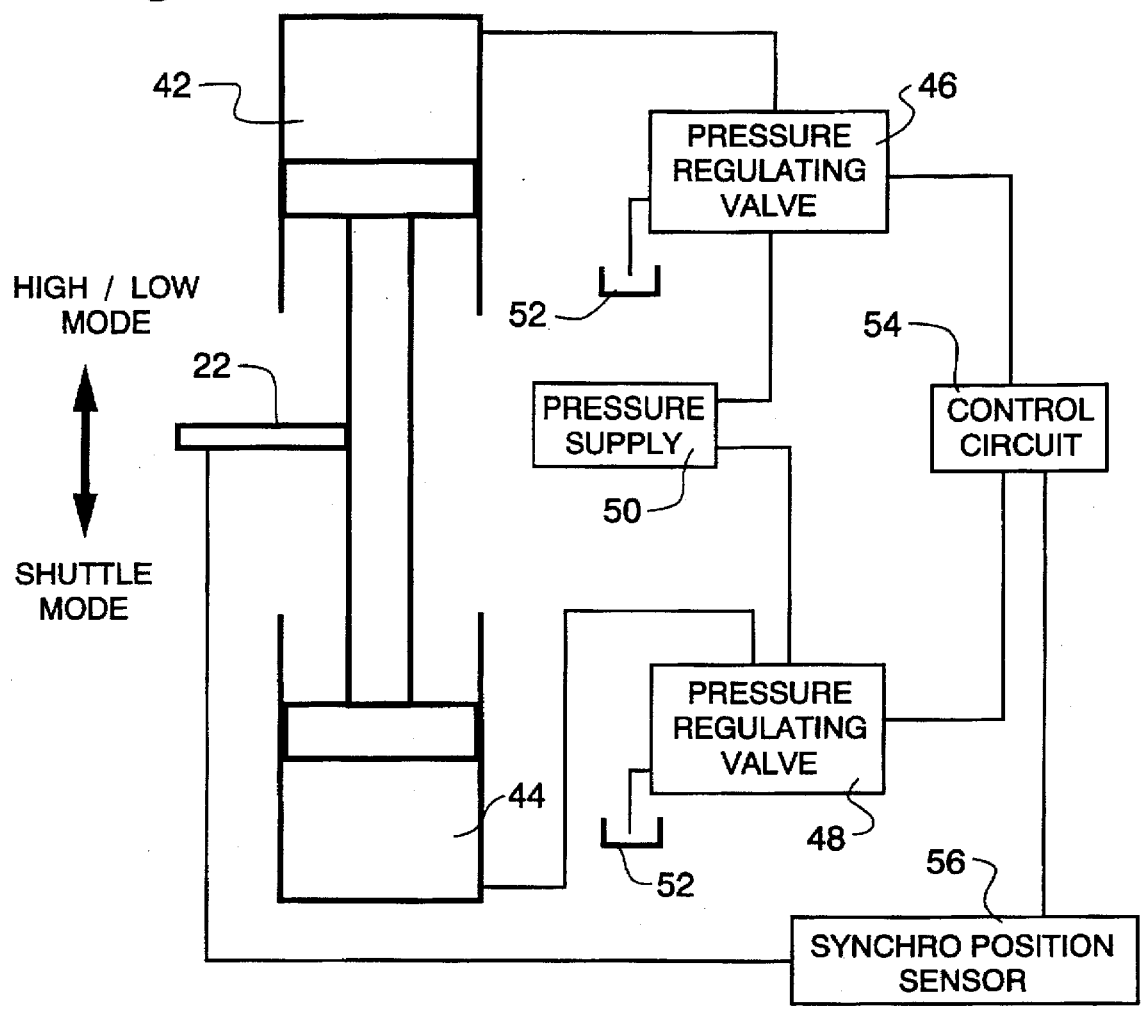
FIG. 2 is a schematic representation of a hydraulic control system of the invention.

FIG. 2 shows a control system comprising two piston/cylinder units 42 and 44 acting in opposite directions on the synchronizer 22. The working chambers of the piston/cylinder units 42, 44 are connected to respective pressure regulating valves 46 and 48 that are each in turn connected to a pressure supply 50 and a drain 52. The pressure regulating valves supply an output pressure that is determined by the mean value of a control current applied to the valves by a control circuit 54. The control circuit receives a mode change signal (not shown) whenever a movement of the synchronizer 22 is to be initiated and also receives a feedback signal from a position sensor 56.

In use, the system is first calibrated such that the synchronizer position sensor 56 can produce one of three possible flags that indicate that the synchronizer lies in the Shift Mode, Neutral or High/Low Mode positions, respectively, or no flag in any intermediate position. These positions are determined by noting the output of a position sensing potentiometer while the engagement of the synchronizer 22 is determined by monitoring the transmission of drive to the tractor wheels.

In a separate calibration step, while the synchronizer 22 is in the High/Low Mode position, the pressure in the piston/cylinder unit 42 is ramped up gradually and the value at which movement of the synchronizer 22 towards the Shuttle Mode position occurs is noted. Similarly, the pressure required in the piston/cylinder unit 44 to initiate movement towards the High/Low Mode position is noted.

Figure 3:
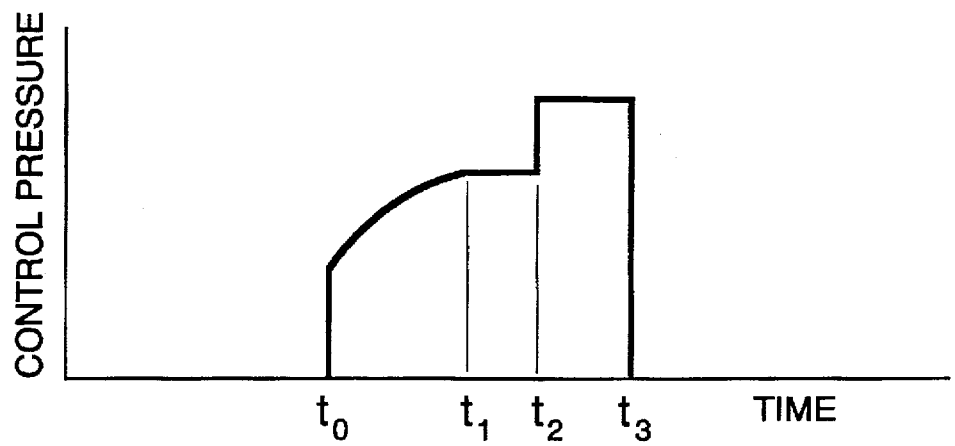
FIG. 3 is a graph showing the variation with time of the hydraulic pressure applied to the piston/cylinder units in FIG. 2 during movements of the synchronizer.

FIG. 3 shows how the pressure applied to one of the piston/cylinder units is varied to effect movement of the synchronizer 22. The pressures determined during calibration are stored in a look-up memory and are used to apply an offset starting pressure to the ramped pressure supplied to the piston/cylinder unit at the time $t_0$ when movement is to be commenced in response to a demand signal received by the control circuit 54. The control circuit then applies to the active regulating valve 46 or 48 a gradually increasing control current to increase the supplied pressure during the interval between times $t_0$ and $t_1$. At the same time, the opposing piston/cylinder unit is connected to drain through its pressure regulating valve so that a net gradually increasing force acts on the synchronizer 22 to move it towards its new position. The gradually increasing force ensures a gradual speed matching of the speeds of the lay shaft and the gear with which the synchronizer is brought into frictional engagement.

At the instant $t_1$, alignment between the teeth of the gear and synchronizer is completed and the synchronizer teeth start to move into meshing engagement with the gear. During the interval $t_1$ to $t_2$ the pressure does not rise in the working chamber because of the expansion caused by the movement. This pressure change could be detected to indicate that meshing of the teeth has commenced but it is preferred in the present embodiment to detect engagement by sensing the appropriate flag at the output of the position sensor 56. When the control circuit detects this flag, it applies a high current pulse during the interval $t_2$ to $t_3$ to cause a pressure pulse that ensures that the synchronizer 22 is driven firmly to the end of its engagement position.

The control circuit 54 may be an analogue circuit but it is preferred to use a digital circuit. To control the pressure output of the regulating valves 46 and 48, the control circuit supplies pulse width modulated signals to driver circuits that apply current to the solenoids of the regulating valves. The driver circuits may conveniently operate in a closed loop mode developing error signals that indicate a difference between the actual value of the regulated pressures and the desired values as set by the pulse width modulated output signals of the control circuit. Such closed loop control ensures that the hydraulic pressure applied to the piston/cylinder units 42, 44 varies only with the pulse width modulated output signals of the control circuit 54 despite variations in such parameters as temperature, viscosity of the fluid and battery voltage.

The effect of stiction can be reduced by superimposing a vibration on the movement of the pistons. In the preferred embodiment of the invention, this may readily be achieved by dithering the widths of the pulses supplied by the control circuit 54 to the driver circuits of the two pressure regulating valves 46, 48.

The invention has been described by reference to the movement of a particular synchronizer in a transmission of a tractor, but it will be clear that it is equally applicable to any case in which a selector fork in a gearbox is driven hydraulically to engage a synchronizer with a gear.

Having thus described the invention, what is claimed is:

1. A hydraulic control system for displacing a synchronizer into engagement with a rotating gear in a gearbox, comprising:

a hydraulic piston/cylinder unit mechanically coupled to the synchronizer;

an electrically controllable pressure regulating valve for supplying hydraulic fluid to the piston/cylinder unit;

an electrical control circuit cooperatively associated with the pressure regulating valve to vary the pressure of the hydraulic fluid supplied to the piston/cylinder unit, wherein during each engagement movement of the synchronizer, the control circuit is operative to increase the pressure of the hydraulic fluid supplied to the piston/cylinder unit progressively; and means for sensing the change in pressure in the piston/cylinder unit resulting from the movement of the synchronizer to determine when axial engagement between the synchronizer and the gear has been achieved, and for rapidly increasing the hydraulic pressure thereafter to its maximum value to ensure full engagement of the synchronizer.

2. The hydraulic control system of claim 1 wherein an applied ramped pressure for the piston/cylinder unit commences with a calibrated value sufficient to overcome stiction.

3. The hydraulic control system of claim 1 wherein the control circuit is a digital circuit operative to supply pulse width modulated control signals for setting the pressures of the regulating valves.

4. The hydraulic control system of claim 3 wherein the control circuit generates output signals which serve to set the regulating valves through closed loop controlled driver circuits that develop error signals indicative of the difference between an actual value of the regulated pressures and desired values as set by a pulse width modulated output signals of the control circuit.

* * * * *